United States Patent
Hikita

(10) Patent No.: US 9,737,993 B2
(45) Date of Patent: Aug. 22, 2017

(54) TAPE LIBRARY APPARATUS AND INFORMATION MANAGEMENT METHOD

(71) Applicant: FUJITSU LIMITED, Kawasaki-shi, Kanagawa (JP)

(72) Inventor: Minoru Hikita, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/955,140

(22) Filed: Dec. 1, 2015

(65) Prior Publication Data

US 2016/0225402 A1   Aug. 4, 2016

(30) Foreign Application Priority Data

Feb. 2, 2015   (JP) ................ 2015-018842

(51) Int. Cl.
*G11B 15/06* (2006.01)
*B25J 9/16* (2006.01)
*G11B 27/10* (2006.01)
*G11B 15/68* (2006.01)
*G11B 5/008* (2006.01)

(52) U.S. Cl.
CPC ............ *B25J 9/1679* (2013.01); *G11B 15/06* (2013.01); *G11B 15/689* (2013.01); *G11B 27/10* (2013.01); *G11B 5/00821* (2013.01); *Y10S 901/02* (2013.01)

(58) Field of Classification Search
CPC ....... G11B 15/06; G11B 15/689; G11B 15/66; G11B 5/008; G11B 5/00821
USPC ................... 360/92.1; 711/112
See application file for complete search history.

(56) References Cited

U.S. PATENT DOCUMENTS

| 6,336,173 | B1 * | 1/2002 | Day, III ............... G06F 3/0614 707/999.201 |
| 6,782,448 | B2 * | 8/2004 | Goodman ............... G06F 8/67 360/12 |
| 9,015,005 | B1 * | 4/2015 | Stripling ............ G06F 11/0727 702/186 |
| 2002/0145034 | A1 * | 10/2002 | Shimada ............... G11B 15/07 235/375 |

(Continued)

FOREIGN PATENT DOCUMENTS

| JP | 2006-164445 | 6/2006 |
| JP | 2007-179694 | 7/2007 |

*Primary Examiner* — Allen T Cao
(74) *Attorney, Agent, or Firm* — Staas & Halsey LLP

(57) ABSTRACT

A tape library apparatus includes a tape drive, a robot unit, and a second processor. The tape drive includes a first access mechanism and a first processor. The first access mechanism is configured to read position information from a non-contact type memory within a tape cartridge. The position information indicates a position of data recorded in a magnetic tape within the tape cartridge. The first processor is configured to perform positioning for the data. The robot unit includes a robot arm and a second access mechanism configured to access the non-contact type memory. The robot arm is configured to store the tape cartridge in the robot unit, and move the tape cartridge to the tape drive. The second processor is configured to control the second access mechanism to read the position information from the non-contact type memory, and store the position information in a non-volatile memory.

6 Claims, 15 Drawing Sheets

(56) References Cited

U.S. PATENT DOCUMENTS

| | | | |
|---|---|---|---|
| 2003/0126361 A1* | 7/2003 | Slater | G06F 3/0607 |
| | | | 711/114 |
| 2005/0137742 A1* | 6/2005 | Goodman | G11B 17/225 |
| | | | 700/214 |
| 2006/0126211 A1 | 6/2006 | Sasaki | |
| 2009/0323963 A1* | 12/2009 | McTeer | H04L 9/0894 |
| | | | 380/277 |
| 2010/0265606 A1* | 10/2010 | Thompson | G11B 5/86 |
| | | | 360/15 |
| 2011/0157742 A1* | 6/2011 | Thompson | G11B 5/86 |
| | | | 360/92.1 |
| 2011/0273795 A1* | 11/2011 | Hoshino | G11B 15/6835 |
| | | | 360/92.1 |
| 2014/0309981 A1* | 10/2014 | Yamato | G06F 3/0604 |
| | | | 703/24 |

* cited by examiner

TAPE LIBRARY APPARATUS AND INFORMATION MANAGEMENT METHOD

CROSS-REFERENCE TO RELATED APPLICATION

This application is based upon and claims the benefit of priority of the prior Japanese Patent Application No. 2015-018842, filed on Feb. 2, 2015, the entire contents of which are incorporated herein by reference.

FIELD

The embodiments discussed herein are related to a tape library apparatus and an information management method.

BACKGROUND

Traditionally, information relating to positions such as an end of data (EOD), a file mark (or a tape mark), or the like is stored in a cartridge memory (hereinafter, referred to as "CM") of a tape cartridge. This information is read into a memory on a controller of a tape drive by a CM reader/writer provided in the tape drive at the time of loading the tape cartridge. The tape drive performs high-speed positioning using the information relating to positioning commands, such as a locate command, a space file command, and the like, from a higher-level host. Access time may be shortened by using the high-speed positioning.

As a related art, for example, there is a technique in which a memory information reading unit of a magnetic tape library apparatus reads information from a memory of a magnetic tape cartridge, and a maintenance/exchange determination unit performs determination whether to maintain or exchange a magnetic tape drive on the basis of the read information. There is another technique in which a sensor attached to a gripping mechanism reads cartridge information from a radio frequency identifier (RFID) chip attached to a cartridge, performs communication with a semiconductor chip attached to a storage rack, and stores the cartridge information in the semiconductor chip.

Related techniques are disclosed in, for example, Japanese Laid-open Patent Publication No. 2006-164445 and Japanese Laid-open Patent Publication No. 2007-179694.

In the related arts, when it is difficult for a tape drive to read information stored in a CM due to some reasons at the time of loading a tape cartridge, the information relating to positions, such as an EOD, a file mark, and the like is unavailable for the tape drive.

SUMMARY

According to an aspect of the present invention, provided is a tape library apparatus including a tape drive, a robot unit, and a second processor. The tape drive includes a first access mechanism and a first processor. The first access mechanism is configured to access a non-contact type memory within a tape cartridge to read position information from the non-contact type memory. The position information indicates a position of data recorded in a magnetic tape within the tape cartridge. The first processor is configured to perform positioning for the data. The robot unit includes a robot arm and a second access mechanism. The robot arm is configured to store the tape cartridge in the robot unit, and move the tape cartridge to the tape drive. The second access mechanism is configured to access the non-contact type memory. The second processor is configured to control the second access mechanism to read the position information from the non-contact type memory, and store the position information in a non-volatile memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an exemplary hardware configuration of a library controller or the like;

DESCRIPTION OF EMBODIMENT

Hereinafter, an embodiment of a tape library apparatus and an information management method according to the present disclosure will be described in detail with reference to the drawings.

First, an exemplary system configuration of a tape library apparatus according to the embodiment will be described.

Figure 1:
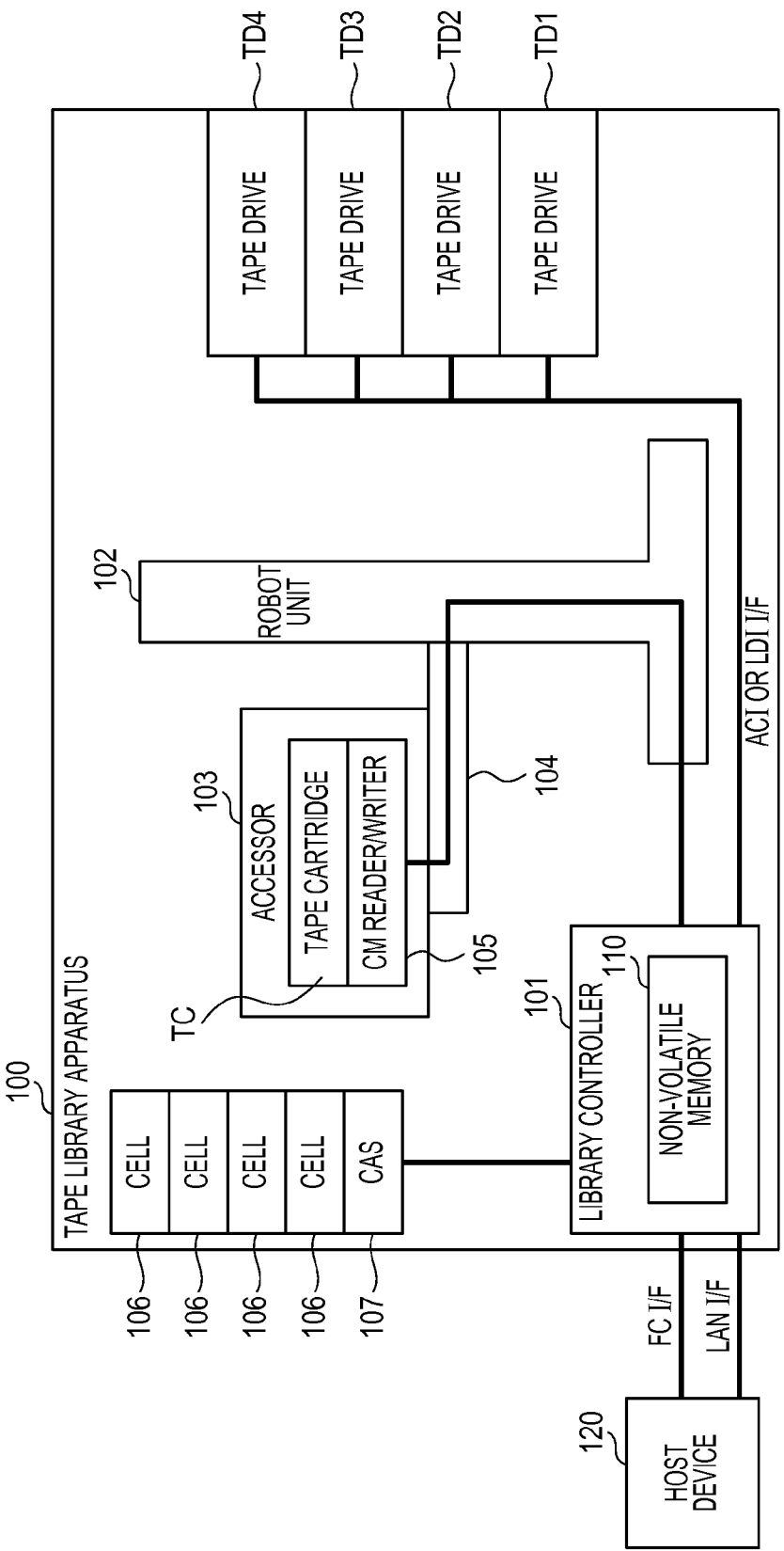
FIG. 1 is a diagram illustrating an exemplary system configuration of a tape library apparatus.

FIG. 1 is a diagram illustrating an exemplary system configuration of a tape library apparatus 100. In FIG. 1, the tape library apparatus 100 includes one or more tape drives TD (in the example of FIG. 1, tape drives TD1 to TD4), a library controller 101, and a robot unit 102.

A tape drive TD is a device that reads or writes data from or to a magnetic tape within a tape cartridge TC inserted thereinto. The tape drive TD is a sequential access device that reads or writes data in a sequential manner. An exemplary device configuration of a tape drive TD will be described later with reference to FIG. 2.

The tape cartridge TC is a cartridge that stores a magnetic tape therein. A cartridge memory (CM) is embedded in the tape cartridge TC. The CM is a non-contact type memory that exchanges information through short-range wireless communication using an electromagnetic field or radio waves. For example, the CM is an RFID.

The library controller 101 has a non-volatile memory 110 and is a controller that controls the entire tape library apparatus 100. The non-volatile memory 110 is a storage device having characteristics where stored content is not erased even in a case where the supply of electrical power from a power supply is blocked. The non-volatile memory 110 is, for example, a flash memory or the like.

The robot unit 102 includes an accessor 103, which stores the tape cartridge TC, and moves the tape cartridge TC with a robot arm 104 under the control of the library controller 101. The accessor 103 includes a CM reader/writer 105 and a bar-code reader (not illustrated).

The CM reader/writer 105 is an access mechanism that reads or writes data from or to the CM within the tape cartridge TC stored in the accessor 103. The bar-code reader obtains an identifier (for example, volume name) for uniquely identifying the tape cartridge TC by reading a bar code label attached to the tape cartridge TC.

The tape library apparatus 100 also includes cells 106 and a cartridge access station (CAS) 107 that store the tape cartridge TC therein. The cells 106 and the CAS 107 are slots for loading or unloading the tape cartridge TC. The CAS 107, for example, has a structure to which a magazine that stores the tape cartridge TC is inserted, and thus loading or unloading the tape cartridge TC from the outside may be carried out even during operation.

For example, the library controller 101 moves the tape cartridge TC, which is stored in a cell 106 or the CAS 107, to the tape drive TD by controlling the robot unit 102 at the time of loading the tape cartridge TC. In addition, for example, the library controller 101 moves the tape cartridge TC, which is inserted into the tape drive TD, to the cell 106 or the CAS 107, by controlling the robot unit 102 at the time of unloading the tape cartridge TC.

In the tape library apparatus 100, the library controller 101, for example, is connected to a host device 120 through an interface (I/F), such as a fibre channel (FC), a local area network (LAN), and the like. The host device 120 is a higher-level device, such as a server, for example, and is a backup server in which backup software is installed. The library controller 101, for example, is connected to the tape drive TD through an I/F, such as ACI, LDI, and the like.

Next, an exemplary device configuration of the tape drive TD according to the embodiment will be described.

Figure 2:
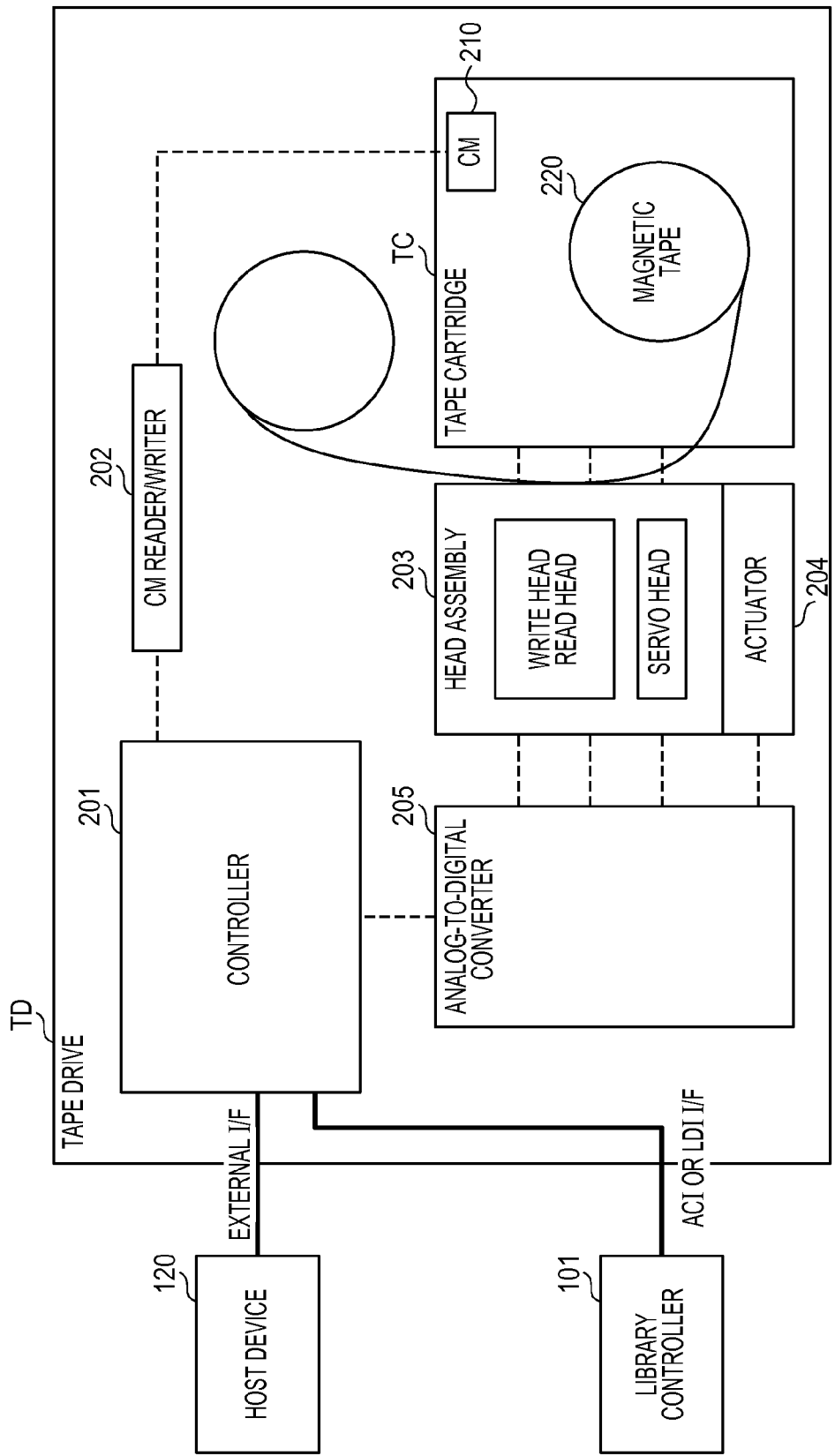
FIG. 2 is a diagram illustrating an exemplary configuration of a tape drive.

FIG. 2 is a diagram illustrating an exemplary configuration of a tape drive TD. In the FIG. 2, the tape drive TD includes a controller 201, a CM reader/writer 202, a head assembly 203, an actuator 204, and an analog-to-digital converter 205.

The controller 201 is a controller that controls the entire tape drive TD. The CM reader/writer 202 is an access mechanism that reads or writes data from or to the CM 210 within the tape cartridge TC inserted into the tape drive TD. The head assembly 203 includes a write head, a read head, and a servo head. The write head is a head for writing data. The read head is a head for reading data. The servo head is a head for reading a target position. The actuator 204 is a seek mechanism for moving a head to a target position. The analog-to-digital converter 205 converts analog signals to digital signals.

In the tape drive TD, the controller 201, for example, is connected to a host device 120 through an external I/F, such as an FC, a small computer system interface (SCSI), a serial attached SCSI (SAS), and the like. In addition, the controller 201, for example, is connected to the library controller 101 through an I/F, such as ACI, LDI, and the like.

Position information relating to positions such as an EOD, a file mark (tape mark), and the like is stored in the CM 210 within the tape cartridge TC. The controller 201 of the tape drive TD performs high-speed positioning of data by reading position information stored in the CM 210 within the tape cartridge TC with the CM reader/writer 202.

Specifically, for example, the controller 201 identifies a position of desired data (for example, a file) on a magnetic tape 220 on the basis of the position information stored in the CM 210. Then, the controller 201 performs fast-forwarding up to a position slightly before the identified position, and reads data from the position at a speed (constant speed) at which reading or writing of data may be carried out so that desired data is found. Access time may be shortened by this high-speed positioning. The content stored in the CM 210 within the tape cartridge TC is updated at the time of unloading.

However, there is a case where it is difficult for the tape drive TD to read position information stored in the CM 210 due to some reasons at the time of loading the tape cartridge TC. A defect factor may be in the CM 210 within the tape cartridge TC or in the CM reader/writer 202 of the tape drive TD.

When the position information stored in the CM 210 is unavailable for tape drive TD, the tape drive TD performs low-speed positioning in which the tape drive TD sequentially reads data from the beginning of the magnetic tape 220, in response to a positioning command from the host device 120. In a case of the low-speed positioning, for example, approximately two hours (approximately three minutes in a case of the high-speed positioning) may be taken for positioning of the data in the tape cartridge TC on which a large amount of data is written, which causes significant delays in, backup processing, restore processing, and the like.

Therefore, according to the present embodiment, the library controller 101 reads the information (referred to as CM information) stored in the CM 210 within the tape cartridge TC with the CM reader/writer 105 of the robot unit 102 at the time of loading or the like of the tape cartridge TC and stores the information in the non-volatile memory 110. With this, information for performing positioning of data by the tape drive TD may be redundantly stored in the non-volatile memory 110.

For example, there is a case where it is difficult for the reader/writer 202 of the tape drive TD to read CM information stored in the CM 210 due to a fault of the CM reader/writer 202. In addition, there is a case where compatibility between the CM reader/writer 202 of the tape drive TD and the CM 210 within the tape cartridge TC is low and reading of the information is difficult even though both of them are not in error. In such a case, by transmitting information stored in the non-volatile memory 110 from the library controller 101 to the tape drive TD, the tape drive TD may perform the high-speed positioning of data using the information transmitted from the library controller 101, and the deterioration of access performance may be reduced.

Next, an exemplary hardware configuration of the library controller 101 illustrated in FIG. 1 and the controller 201 illustrated in FIG. 2 (hereinafter, referred to as "library controller 101 or the like") will be described.

Figure 3:
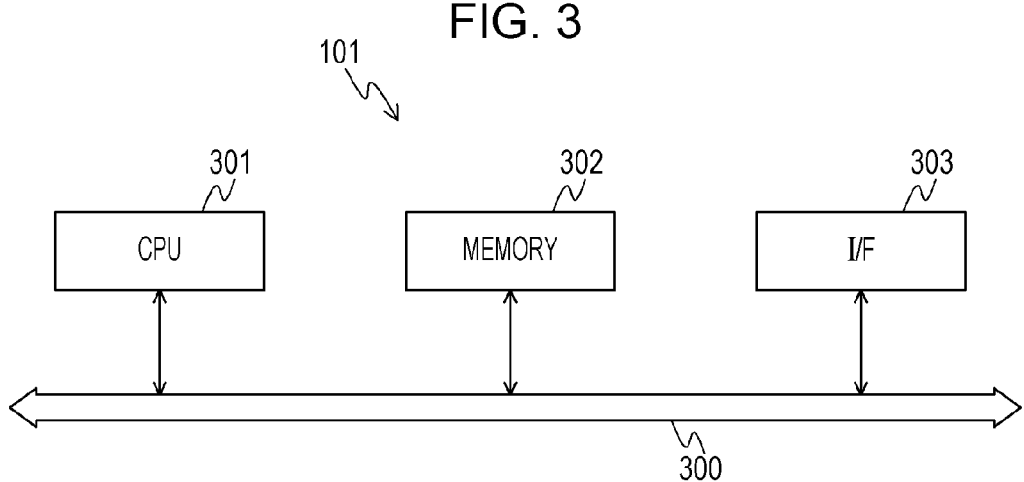

FIG. 3 is a diagram illustrating an exemplary hardware configuration of the library controller 101 or the like. In FIG. 3, the library controller 101 or the like includes a central processing unit (CPU) 301, a memory 302, and an I/F 303. The respective units are connected with each other through a bus 300.

The CPU 301 controls the entire library controller 101 or the like. The memory 302, for example, includes a read-only memory (ROM), a random access memory (RAM), a flash ROM, or the like. More specifically, the flash ROM stores therein an operating system (OS), firmware, or the like, and the ROM stores therein an application program. The RAM is used as a work area of the CPU 301. The program stored in the memory 302 is loaded and executed by the CPU 301 to perform processing coded in the program. The non-volatile memory 110 illustrated in FIG. 1 is included in the memory 302 of the library controller 101.

The I/F 303 controls input or output of data from or to other devices. Specifically, for example, the I/F 303 is connected to a network, such as a LAN, a wide area network (WAN), the internet, and the like, through a communication line, and connected to other devices through the network. Accordingly, the I/F 303 controls input or output of data from or to other devices as an interface between the network and the inside of the library controller 101 or the like.

Next, a specific example of library flag management information used by the library controller 101 of the tape library apparatus 100 will be described. The library flag management information, for example, is stored in the non-volatile memory 110 (see FIG. 1) of the library controller 101.

Figure 4:
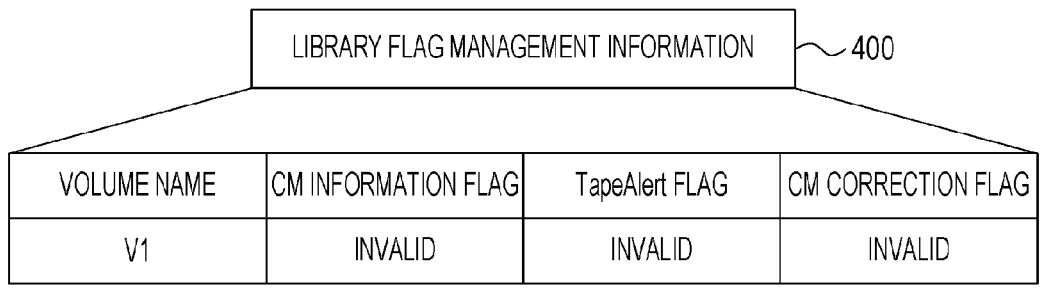
FIG. 4 is a diagram illustrating a specific example of library flag management information.

FIG. 4 is a diagram illustrating a specific example of the library flag management information. In the FIG. 4, the library flag management information 400 has a volume name, a CM information flag, a TapeAlert flag, and a CM correction flag.

The volume name is an identifier for uniquely identifying the tape cartridge TC. The volume name, for example, may be obtained by reading a bar code label attached to the tape cartridge TC with a bar-code reader of the robot unit 102 (see FIG. 1).

The CM information flag is a flag indicating whether or not CM information (normal CM information) stored in the CM 210 (see FIG. 2) within the tape cartridge TC is stored in the library controller 101. In the CM information flag, "valid" is set when the CM information is stored, and "invalid" is set when the CM information is not stored.

The TapeAlert flag is a flag indicating whether or not a tape alert is notified from the tape drive TD. The tape alert is an error notification indicating that there is a failure in writing of the CM information to the CM 210. In the TapeAlert flag, "valid" is set when the tape alert is notified, and "invalid" is set when the tape alert is not notified.

The CM correction flag is a flag indicating whether or not the CM information stored in the CM 210 is corrected in the library controller 101. In the CM correction flag, "valid" is set when the CM information is corrected, and "invalid" is set when the CM information is not corrected. In an initial state, "invalid" is set in each of flags (CM information flag, TapeAlert flag, and CM correction flag).

Next, a specific example of drive flag management information which is used by the controller 201 of the tape drive TD will be described. The drive flag management information, for example, is stored in a memory 302 (see FIG. 3) of the controller 201.

Figure 5:
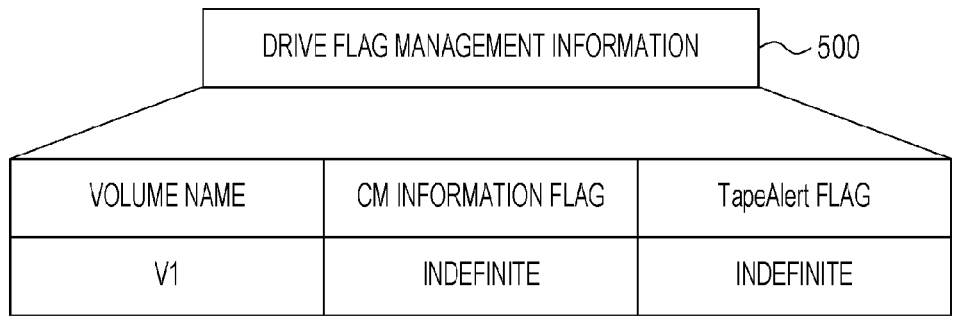
FIG. 5 is a diagram illustrating a specific example of drive flag management information.

FIG. 5 is a diagram illustrating a specific example of the drive flag management information. In FIG. 5, the drive flag management information 500 has a volume name, a CM information flag, and a TapeAlert flag.

The volume name is an identifier for uniquely identifying the tape cartridge TC. The CM information flag is a flag indicating whether or not CM information (normal CM information) stored in the CM 210 within the tape cartridge TC is stored in the controller 201. In the CM information flag, "valid" is set when the CM information is stored, and "invalid" is set when the CM information is not stored.

The TapeAlert flag is a flag indicating whether or not a tape alert is notified to the library controller 101. In the TapeAlert flag, "valid" is set when the tape alert is notified, and "invalid" is set when the tape alert is not notified. In an initial state, "indefinite" is set in each of flags (CM information flag and TapeAlert flag).

Next, an exemplary functional configuration of the library controller 101 of the tape library apparatus 100 will be described.

Figure 6:
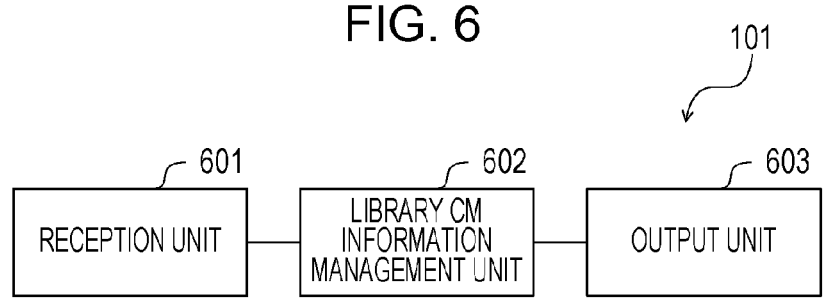
FIG. 6 is a diagram illustrating an exemplary functional configuration of a library controller of a tape library apparatus.

FIG. 6 is a diagram illustrating an exemplary functional configuration of the library controller 101 of the tape library apparatus 100. In FIG. 6, the library controller 101 includes a reception unit 601, a library CM information management unit 602, and an output unit 603. The reception unit 601 to the output unit 603 have functions of a controller, and specifically, the CPU 301 realizes the functions, for example, by executing a program stored in the memory 302 of the library controller 101 illustrated in FIG. 3, or the I/F 303 realizes the functions. A processing result of each functional unit, for example, is stored in the memory 302.

When a load instruction for a tape cartridge TC stored in a cell 106 or a CAS 107 (hereinafter, denoted as "cell 106/CAS 107") is issued from the host device 120, the reception unit 601 receives the load instruction from the host device 120. The load instruction is an instruction for loading (mounting) the tape cartridge TC in the tape drive TD.

The load instruction, for example, includes information (for example, a cell identifier (ID) or the like) for identifying the cell 106/CAS 107 in which the tape cartridge TC to be loaded is stored, a volume name for uniquely identifying the tape cartridge TC to be loaded, or the like.

The library CM information management unit 602 obtains CM information stored in the CM 210 within the tape cartridge TC with the CM reader/writer 105 of the robot unit 102 in response to reception of the load instruction for the tape cartridge TC. The CM information is management information including position information of data recorded in the magnetic tape 220 within the tape cartridge TC, a usage history of the tape cartridge TC, an error log, and the like.

In more detail, the CM information includes, for example, the position of the EOD or the file marks, and information relating to the number of the file marks. In addition, the CM information, for example, may include values noted below.

Thread Count→The number of times of mounting (the number of times of loading)

Write Retries Total→The total number of occurrences of write retry

Read Retries Total→The total number of occurrences of read retry

Uncorrectable Write Errors Total→The total number of occurrences of uncorrectable write error Uncorrectable Read Errors Total→The total number of occurrences of uncorrectable read error Suspended Write Total→The total number of occurrences of suspended write retry Fatal Suspended Total→The total number of occurrences of fatal suspended write error Write Data Set Total→The total number of sets of write data Read Data Set Total→The total number of sets of read data Drive Serial No.→Serial number of tape drive TD used Initializing Drive Serial No.→Serial number of initialized tape drive TD Furthermore, the CM information, for example, may include the following values related to the past four mountings (loadings).

Thread Count→The number of times of mounting (the number of times of loading)

Write Retries→The number of occurrences of write retry

Read Retries→The number of occurrences of read retry

Uncorrectable Write Errors→The number of occurrences of uncorrectable write error Uncorrectable Read Errors→The number of occurrences of uncorrectable read error Suspended Write→The number of occurrences of suspended write retry Fatal Suspended→The number of occurrences of fatal suspended write error Write Data Set→The number of sets of write data Read Data Set→The number of sets of read data Specifically, for example, the library CM information management unit 602 first positions the accessor 103 of the robot unit 102 to the cell 106/CAS 107 in which the tape cartridge TC to be loaded is stored by controlling the robot unit 102. Next, the library CM information management unit 602 obtains a volume name of the tape cartridge TC by reading a bar code label of the tape cartridge TC with the accessor 103.

Then, the library CM information management unit 602 stores, in the accessor 103, the tape cartridge TC which is stored in the cell 106/CAS 107. Next, the library CM information management unit 602 determines whether or not "valid" is set in the CM information flag, with reference to the library flag management information corresponding to the obtained volume name.

When "valid" is set in the CM information flag, the library CM information management unit 602 does not obtain the CM information. When "invalid" is set in the CM information flag, the library CM information management unit 602 obtains CM information stored in the CM 210 within the tape cartridge TC by reading the CM information stored in the CM 210 with the CM reader/writer 105.

When normal CM information (for example, CM information without corruption or missing data) is obtained, the library CM information management unit 602 stores the obtained CM information in the non-volatile memory 110 while associating the CM information with the obtained volume name. More specifically, for example, the obtained CM information is stored in the memory being included in VOL information corresponding to the obtained volume name.

The VOL information is information that stores CM information stored in the CM 210 within the tape cartridge TC and the library flag management information (for example, see FIG. 4) while associating the both with the volume name of the tape cartridge TC. The VOL information, for example, is stored in a VOL information area secured, within the non-volatile memory 110, for each tape cartridge TC. With this, the tape drive TD may hold, in the non-volatile memory 110 of the library controller 101, information for performing positioning of data.

When the normal CM information is obtained, the library CM information management unit 602 also sets the CM information flag (for example, see FIG. 4) of the library flag management information to "valid". With this, the recording may be performed so that whether the CM information stored in the CM 210 within the tape cartridge TC is stored in the library controller 101 is determined.

When a tape cartridge TC is input to the CAS 107, the library CM information management unit 602 obtains the CM information stored in the CM 210 within the tape cartridge TC with the CM reader/writer 105 of the robot unit 102 upon detecting that the tape cartridge TC is input to the CAS 107.

More specifically, for example, the library CM information management unit 602 first positions, by controlling the robot unit 102, the accessor 103 of the robot unit 102 to the CAS 107 in which the tape cartridge TC is input. Next, the library CM information management unit 602 obtains a volume name of the tape cartridge TC by reading a bar code label of the tape cartridge TC with the accessor 103.

Then, the library CM information management unit 602 stores, in the accessor 103, the tape cartridge TC which is stored in the CAS 107. Next, the library CM information management unit 602 obtains CM information stored in the CM 210 within the tape cartridge TC by reading the CM information stored in the CM 210 with the CM reader/writer 105.

When normal CM information is obtained, the library CM information management unit 602 stores the obtained CM information in the non-volatile memory 110 while including the CM information in the VOL information corresponding to the obtained volume name. When the normal CM information is obtained, the library CM information management unit 602 also sets the CM information flag of the library flag management information to "valid". When the obtained CM information is abnormal, the library CM information management unit 602 sets the CM information flag of the library flag management information to "invalid".

When an inquiry about the CM information flag is issued from the tape drive TD, the reception unit 601 receives the inquiry about the CM information flag from the tape drive TD. The inquiry about the CM information flag is an inquiry sent from the tape drive TD, when reading of the CM information in the tape drive TD fails.

The library CM information management unit 602 identifies the CM information flag with reference to the library flag management information for the tape cartridge TC in response to the reception of the inquiry about the CM information flag. Then, the library CM information management unit 602 notifies the tape drive TD of the identified CM information flag.

With this, the library controller 101 may notify, in response to the inquiry about the CM information flag from the tape drive TD, the tape drive TD of whether or not normal CM information stored in the CM 210 within the tape cartridge TC is stored.

The reception unit 601 receives a transfer request for the CM information from the tape drive TD. The transfer request for the CM information is a request sent from the tape drive TD when reading of the CM information in the tape drive TD fails.

The library CM information management unit 602 reads CM information stored in the VOL information area for the tape cartridge TC within the non-volatile memory 110 in response to the reception of the transfer request for the CM information. Then, the library CM information management unit 602 transmits the read CM information to the tape drive TD.

With this, the library controller 101 may transmit normal CM information stored in the non-volatile memory 110 to the tape drive TD in response to the transfer request for the CM information from the tape drive TD.

When CM information is transmitted from tape drive TD, the reception unit 601 receives the CM information from the tape drive TD. Specifically, the reception unit 601, for example, receives from the controller 201, at the time of unloading the tape cartridge TC, the CM information (information stored in the CM 210 as the CM information) which is managed on the memory 302 of the controller 201.

The library CM information management unit 602 stores the received CM information in the VOL information area for the tape cartridge TC within the non-volatile memory 110 in response to the reception of the CM information. At this time, the library CM information management unit 602 sets the CM information flag of the library flag management information to "valid", and the TapeAlert flag to "invalid".

With this, the CM information stored in the non-volatile memory 110 may be updated by obtaining the latest CM information from the tape drive TD at the time of unloading the tape cartridge TC.

When a tape alert is notified from the tape drive TD, the reception unit 601 receives the tape alert from the controller 201 of the tape drive TD. The tape alert is an alert sent from the tape drive TD, when writing of the CM information in the tape drive TD fails.

The library CM information management unit 602 sets the TapeAlert flag of the library flag management information for the tape cartridge TC to "valid" in response to the reception of the tape alert. With this, the recording may be performed so that the tape cartridge TC that has failed in writing of the CM information in the tape drive TD is discriminated.

When an unload instruction for a tape cartridge TC inserted into a tape drive TD is issued from the host device 120, the reception unit 601 receives the unload instruction. The unload instruction is an instruction for unloading (unmounting) the tape cartridge TC from the tape drive TD.

Specifically, the reception unit 601 receives, from the controller 201 of the tape drive TD, the unload instruction issued from the host device 12, for example. The unload instruction may include, for example, information for identifying the tape drive TD in which the tape cartridge TC to be unloaded is stored, a volume name for uniquely identifying the tape cartridge TC to be unloaded, or the like.

The library CM information management unit 602 updates the CM correction flag (for example, see FIG. 4) of the library flag management information for the tape cartridge TC in response to the reception of the unload instruction for the tape cartridge TC.

Specifically, for example, the library CM information management unit 602 first positions, by controlling the robot unit 102, the accessor 103 of the robot unit 102 to the tape drive TD into which the tape cartridge TC to be unloaded is inserted. Then, the library CM information management unit 602 stores, in the accessor 103, the tape cartridge TC inserted into the tape drive TD.

Next, the library CM information management unit 602 determines whether or not the TapeAlert flag is "valid" with reference to the library flag management information for the tape cartridge TC to be unloaded. When the TapeAlert flag is "valid", the library CM information management unit 602 writes, to the CM 210 within the tape cartridge TC, CM information included in the VOL information for the tape cartridge TC to be unloaded with the CM reader/writer 105.

That is, when the TapeAlert flag is "valid", the library CM information management unit 602 determines that writing of the CM information in the tape drive TD fails. Accordingly, the library CM information management unit 602 attempts to write the CM information to the CM 210 within the tape cartridge TC with the CM reader/writer 105 of the robot unit 102 using the CM information stored in the non-volatile memory 110.

Next, the library CM information management unit 602 obtains the CM information stored in the CM 210 by reading the CM information stored in the CM 210 with the CM reader/writer 105 so as to determine whether or not the CM information is normally written. When normal CM information is obtained, the library CM information management unit 602 sets the CM correction flag of the library flag management information to "valid".

With this, when the writing of the CM information in the tape drive TD fails, writing of the CM information to the CM 210 using the CM reader/writer 105 of the robot unit 102 may be attempted. When the writing of the CM information to the CM 210 succeeds, the CM correction flag of the library flag management information may be set to "valid".

The output unit 603 outputs the library flag management information at the time of unloading the tape cartridge TC. As an output format of The output unit 603 may output the library flag management information, for example, by transmitting the library flag management information to an external unit (for example, host device 120) through the I/F 303, by storing the library flag management information in a storage unit such as the memory 302, or the like.

Figure 7:
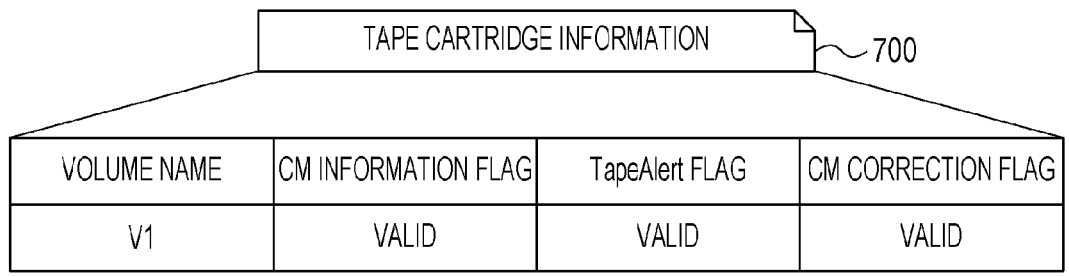
FIG. 7 is a diagram illustrating a specific example of tape cartridge information.

Specifically, the output unit 603, for example, may transmit tape cartridge information 700, as illustrated in FIG. 7, to the host device 120 in response to a fact that the tape cartridge TC to be unloaded is stored in the cell 106/CAS 107. A specific example of the tape cartridge information 700 will be described.

FIG. 7 is a diagram illustrating a specific example of the tape cartridge information. In FIG. 7, the tape cartridge information 700 has a volume name, a CM information flag, a TapeAlert flag, and a CM correction flag.

The volume name is an identifier for uniquely identifying the tape cartridge TC. In the example in FIG. 7, "V1" is set in the volume name. The CM information flag is a flag indicating whether or not normal CM information stored in the CM 210 (see FIG. 2) within the tape cartridge TC is stored in the library controller 101. In the example in FIG. 7, "valid" is set in the CM information flag.

The TapeAlert flag is a flag indicating whether or not a tape alert is notified from the tape drive TD. In the example in FIG. 7, "valid" is set in the TapeAlert flag. The CM correction flag is a flag indicating whether or not the CM information stored in the CM 210 within the tape cartridge TC is corrected. In the example in FIG. 7, "valid" is set in the CM correction flag.

According to the tape cartridge information 700, the TapeAlert flag is "valid", and the CM correction flag is "valid". Therefore, a user may know that normal CM information is written in the CM 210 by the CM reader/writer 105 of the robot unit 102, while writing of the CM information in the tape drive TD fails. In other words, the user may infer that there is a defect factor in the CM reader/writer 202 of the tape drive TD side.

When the TapeAlert flag is "valid" and the CM correction flag is "invalid", the user may know that writing of the CM information fails in both of the tape drive TD and the CM reader/writer 105 of the robot unit 102. In other words, the user may infer that there is a defect factor in the CM 210 within the tape cartridge TC.

Next, an exemplary functional configuration of the controller 201 of the tape drive TD will be described.

Figure 8:
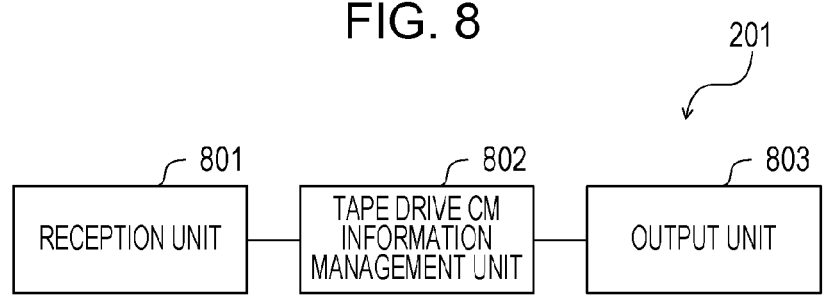
FIG. 8 is a diagram illustrating an exemplary functional configuration of a controller of a tape drive.

FIG. 8 is a diagram illustrating an exemplary functional configuration of the controller 201 of the tape drive TD. In FIG. 8, the controller 201 includes a reception unit 801, a tape drive CM information management unit 802, and an output unit 803. The reception unit 801 to the output unit 803 have functions of a controller, and specifically, the CPU 301 realizes the functions, for example, by executing a program stored in the memory 302 of the controller 201 illustrated in FIG. 3, or the I/F 303 realizes the functions. A processing result of each functional unit, for example, is stored in the memory 302.

When a load instruction for a tape cartridge TC is issued from the host device 120, the reception unit 801 receives the load instruction. Specifically, the reception unit 801 receives, for example, from the library controller 101 of the tape library apparatus 100, the load instruction issued from the host device 120. Alternatively, the reception unit 801 may determine to have received the load instruction issued from the host device 120 in response to a fact that the tape cartridge TC is inserted into the tape drive.

The tape drive CM information management unit 802 obtains the CM information stored in the CM 210 within the tape cartridge TC with the CM reader/writer 202 in response to the reception of the load instruction for the tape cartridge TC.

Specifically, the tape drive CM information management unit 802 is clutch-coupled with the tape cartridge TC by descending a loader carrier (transportation mechanism), for example. Then, the tape drive CM information management unit 802 obtains the CM information stored in the CM 210 within the tape cartridge TC by reading the CM information stored in the CM 210 with the CM reader/writer 202.

When the obtained CM information is normal, the tape drive CM information management unit 802 sets the CM information flag (for example, see FIG. 5) of the drive flag management information to "valid". The drive flag management information, for example, is generated corresponding to the tape cartridge TC inserted into the tape drive TD, and stored in the memory 302 of the controller 201.

When the obtained CM information is abnormal, the tape drive CM information management unit 802 inquires at the library controller 101 of the tape library apparatus 100 about the CM information flag. If the result of the inquiry about the CM information flag is that the CM information flag is "invalid", the tape drive CM information management unit 802 sets the CM information flag of the drive flag management information to "invalid".

If the result of the inquiry about the CM information flag is that the CM information flag is "valid", the tape drive CM information management unit 802 transmits a transfer request for the CM information to the library controller 101. Then, the tape drive CM information management unit 802 sets the CM information flag of the drive flag management information to "valid" in response to reception of the CM information from the library controller 101.

With this, even in a case where reading of the CM information in the tape drive TD fails due to some defects, the normal CM information may be obtained from the library controller 101 if normal CM information is stored in the library controller 101.

Where an unload instruction for a tape cartridge TC inserted into a tape drive is issued from host device 120, the reception unit 801 receives the unload instruction from the host device 120.

In response to reception of the unload instruction for the tape cartridge TC, the tape drive CM information management unit 802 transmits, to the library controller 101, the CM information managed on the memory 302 of the controller 201. The CM information managed on the memory 302 is information relating to the latest EOD, a position of a file mark, or the like stored in the CM 210 as the CM information.

In addition, the tape drive CM information management unit 802 writes the CM information managed on the memory 302 to the CM 210 within the tape cartridge TC with the CM reader/writer 202 in response to the reception of the unload instruction for the tape cartridge TC.

Next, the tape drive CM information management unit 802 obtains CM information stored in the CM 210 by reading the CM information stored in the CM 210 with the CM reader/writer 202 so as to determine whether or not the CM information is normally written. When normal CM information is obtained, the tape drive CM information management unit 802 sets the CM information flag of the drive flag management information to "valid". With this, the CM information stored in the CM 210 may be updated.

When the obtained CM information is abnormal, the tape drive CM information management unit 802 notifies the library controller 101 of a tape alert. Then, the tape drive CM information management unit 802 sets the TapeAlert flag of the drive flag management information to "valid". With this, the recording may be performed such that whether the writing of the CM information to the CM 210 in the tape drive TD fails is determined.

The output unit 803 outputs drive flag management information at the time of unloading the tape cartridge TC. Specifically, when a TapeAlert flag of the drive flag management information is "valid", for example, the output unit 803 may transmit an error notification (for example, Sense Page 0x24) of the tape cartridge TC to the host device 120. With this, in the host device 120, statistical information on an error generated in the tape cartridge TC may be collected.

Next, various processing sequences performed by the library controller 101 of the tape library apparatus 100 will be described. First, an initialization processing sequence performed by the library controller 101 will be described. The initialization processing is performed at the time of the power-on of the tape library apparatus 100.

Figure 9:
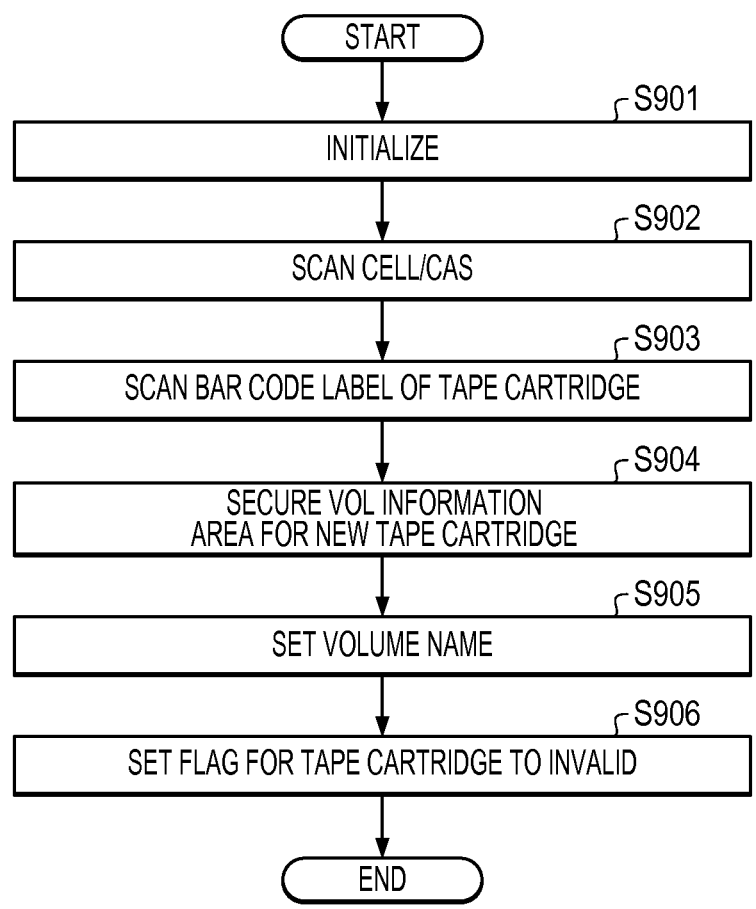
FIG. 9 is a flowchart illustrating an example of an initialization processing sequence performed by a library controller of a tape library apparatus.

FIG. 9 is a flowchart illustrating an example of an initialization processing sequence performed by the library controller 101 of the tape library apparatus 100. In the flowchart illustrated in FIG. 9, the library controller 101 first initializes the tape library apparatus 100 in response to the power-on of the tape library apparatus (S901).

Next, the library controller 101 scans the entirety of the cell 106/CAS 107 by controlling the robot unit 102 (S902), and scans a bar code label of the tape cartridge TC stored in each cell 106/CAS 107 (S903).

The library controller 101 secures a VOL information area for a new tape cartridge TC in the non-volatile memory 110 (S904), and sets a volume name of the new tape cartridge TC in the memory (S905). Next, the library controller 101 sets the entirety of flags of the library flag management information for the entirety of tape cartridges TC to "invalid" (S906), and ends the processing sequence illustrated in the flowchart.

With this, in an assumption that the tape cartridge TC may be manually replaced during the power-off of the tape library apparatus 100, the CM information for the entirety of tape cartridges TC may be controlled to be invalid, by setting the entirety of flags of the entirety of tape cartridges TC to "invalid" at the time of the power-on of the tape library apparatus 100.

Next, a first flag management processing sequence performed by the library controller 101 of the tape library apparatus 100 will be described. The first flag management processing is performed when a tape cartridge TC is input from the outside using the CAS 107.

Figure 10:
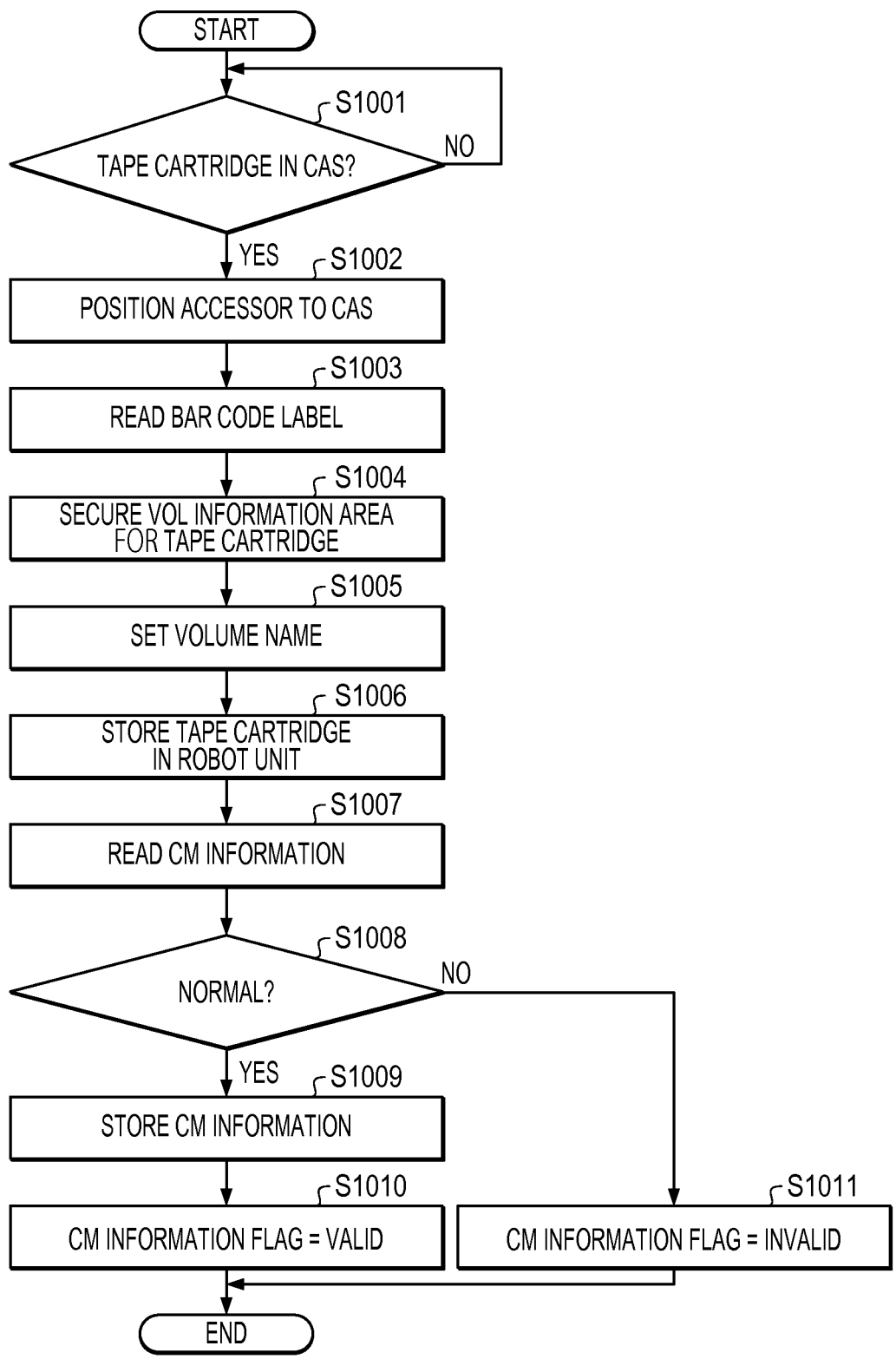
FIG. 10 is a flowchart illustrating an example of a first flag management processing sequence performed by a library controller of a tape library apparatus.

FIG. 10 is a flowchart illustrating an example of the first flag management processing sequence performed by the library controller 101 of the tape library apparatus 100. In the flowchart illustrated in FIG. 10, the library controller 101 first determines whether or not a tape cartridge TC is input to the CAS 107 (S1001).

The library controller 101 waits for a tape cartridge TC to be input to the CAS 107 (S1001: No). When a tape cartridge TC is input to the CAS 107 (S1001: Yes), the library controller 101 positions the accessor 103 of the robot unit 102 to the CAS 107 to which the tape cartridge TC is input, by controlling the robot unit 102 (S1002).

Next, the library controller 101 obtains a volume name of the tape cartridge TC by reading a bar code label of the tape cartridge TC with the accessor 103 (S1003). Then, the library controller 101 secures a VOL information area for the tape cartridge TC in the non-volatile memory 110 (S1004), and sets the volume name of the tape cartridge TC therein (S1005).

Next, the library controller 101 stores, in the accessor 103 of the robot unit 102, the tape cartridge TC stored in the CAS 107 (S1006). Next, the library controller 101 obtains the CM information stored in the CM 210 within the tape cartridge TC by reading the CM information stored in the CM 210 with the CM reader/writer 105 of the robot unit 102 (S1007).

The library controller 101 determines whether or not the obtained CM information is normal (S1008). When the obtained CM information is normal (S1008: Yes), the library controller 101 stores the obtained CM information in the non-volatile memory 110 while including the CM information in the VOL information corresponding to the obtained volume name (S1009).

The library controller 101 sets the CM information flag of the library flag management information to "valid" (S1010), and ends the processing sequence illustrated in the flowchart. When the CM information is abnormal (S1008: No), the library controller 101 sets the CM information flag of the library flag management information to "invalid" (S1011), and ends the processing sequence illustrated in the flowchart.

With this, the library flag management information may be stored in the VOL information area by securing the VOL information area corresponding to the tape cartridge TC input from the outside using the CAS 107.

Next, a load processing sequence performed by the library controller 101 of the tape library apparatus 100 will be described. The load processing is performed when a load instruction for a tape cartridge TC is received from the host device 120. An exemplary transition of the library flag management information in the course of the load processing sequence will be described.

Figure 11:
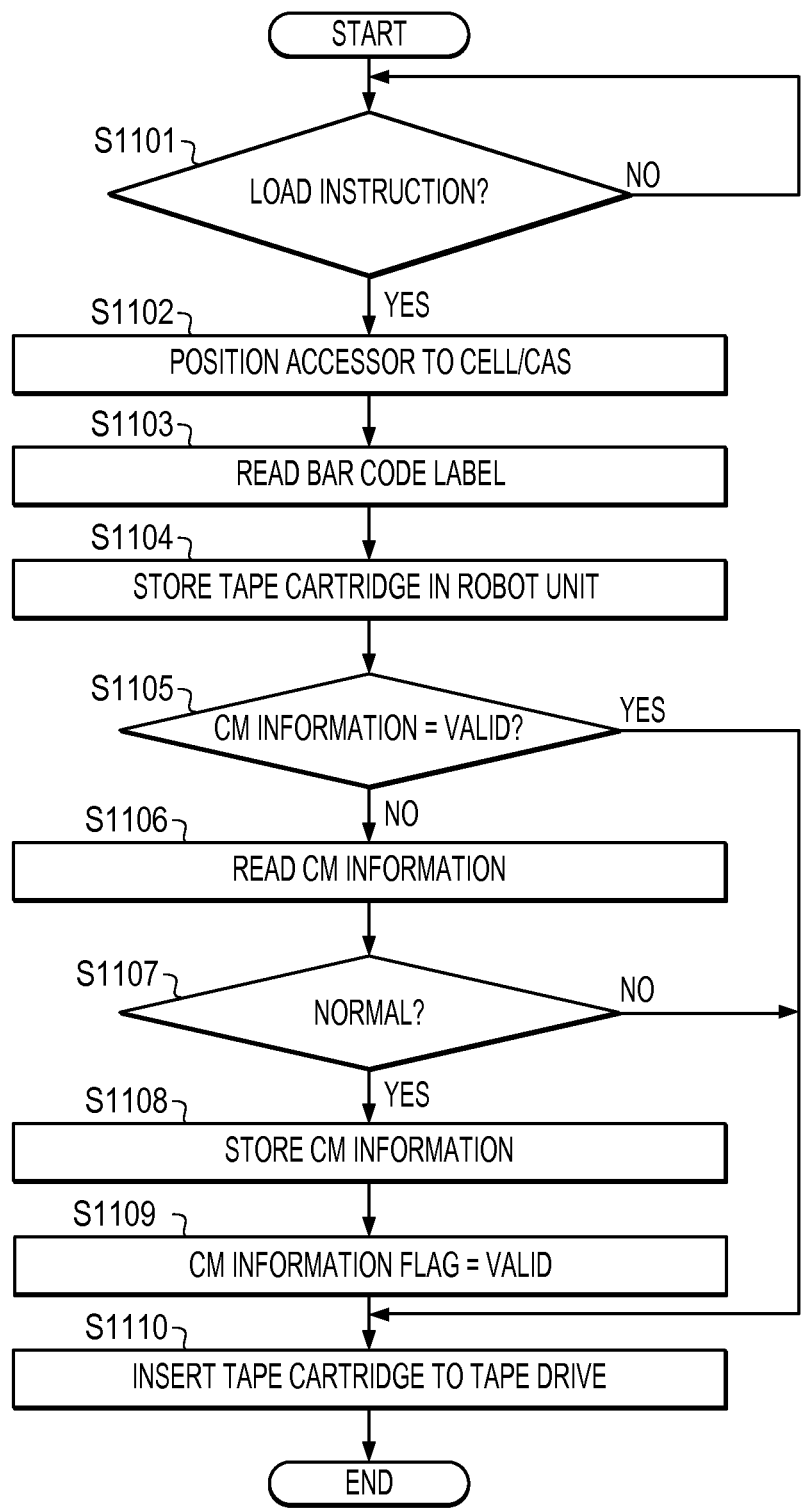
FIG. 11 is a flowchart illustrating an example of a load processing sequence performed by a library controller of a tape library apparatus.
Figure 12:
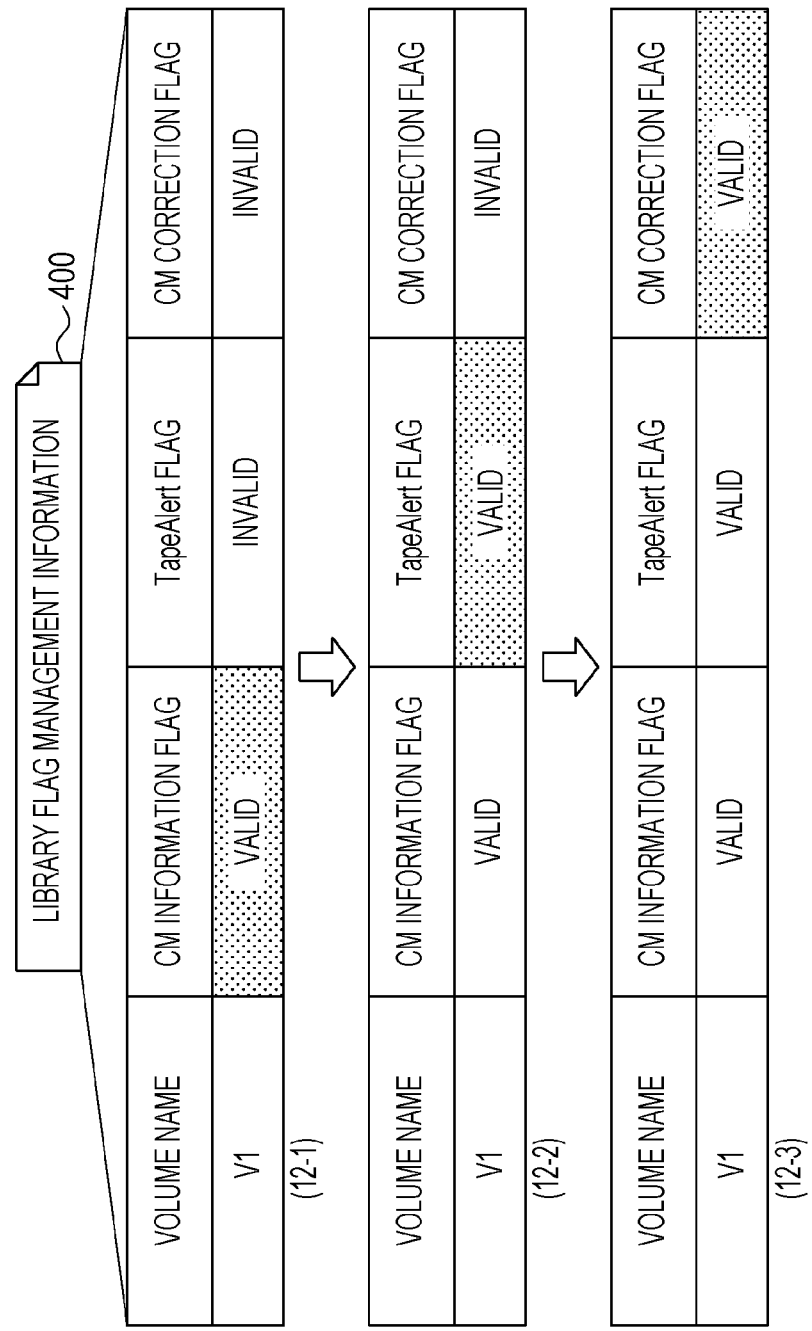
FIG. 12 is a diagram illustrating an exemplary transition of library flag management information.

FIG. 11 is a flowchart illustrating an example of a load processing sequence performed by the library controller 101 of the tape library apparatus 100. FIG. 12 is a diagram illustrating an exemplary transition of the library flag management information.

In the flowchart illustrated in FIG. 11, the library controller 101 first determines whether or not a load instruction for a tape cartridge TC stored in a cell 106/CAS 107 is received from the host device 120 (S1101). The library controller 101 waits for reception of a load instruction for a tape cartridge TC (S1101: No).

When a load instruction for a tape cartridge TC is received (S1101: Yes), the library controller 101 positions, by controlling the robot unit 102, the accessor 103 of the robot unit 102 to the cell 106/CAS 107 in which the tape cartridge TC to be loaded is stored (S1102).

Next, the library controller 101 obtains a volume name of the tape cartridge TC by reading a bar code label of the tape cartridge TC with the accessor 103 (S1103). Then, the library controller 101 stores, in the accessor 103 of the robot unit 102, the tape cartridge TC stored in the cell 106/CAS 107 (S1104).

Next, the library controller 101 determines whether or not "valid" is set in the CM information flag, with reference to the library flag management information corresponding to the obtained volume name (S1105). When "valid" is set in the CM information flag (S1105: Yes), the library controller 101 proceeds to S1110.

When "invalid" is set in the CM information flag (S1105: No), the library controller 101 obtains the CM information stored in the CM 210 within the tape cartridge TC by reading the CM information stored in the CM 210 with the CM reader/writer 105 of the robot unit 102 (S1106).

Next, the library controller 101 determines whether or not the obtained CM information is normal (S1107). When the obtained CM information is abnormal (S1107: No), the library controller 101 proceeds to S1110.

When the obtained CM information is normal (S1107: Yes), the library controller 101 stores the obtained CM information in the non-volatile memory 110 while including the CM information in the VOL information corresponding to the obtained volume name (S1108).

Next, the library controller 101 sets the CM information flag of the library flag management information to "valid" (S1109). In an example of (12-1) illustrated in FIG. 12, the CM information flag of the library flag management information 400 in the tape cartridge TC having the volume name "V1" is set to "valid".

Then, the library controller 101 inserts the tape cartridge TC into the tape drive TD (S1110), and ends the processing sequence illustrated in the flowchart.

With this, the CM information may be stored in the non-volatile memory 110 by obtaining the CM information stored in the CM 210 within the tape cartridge TC using the CM reader/writer 105 of the robot unit 102 at the time of loading the tape cartridge TC.

Next, a CM information transmission processing sequence performed by the library controller 101 of the tape library apparatus 100 will be described. The CM information transmission processing is performed when an inquiry about the CM information flag is received from the tape drive TD that has failed in reading of the CM information.

Figure 13:
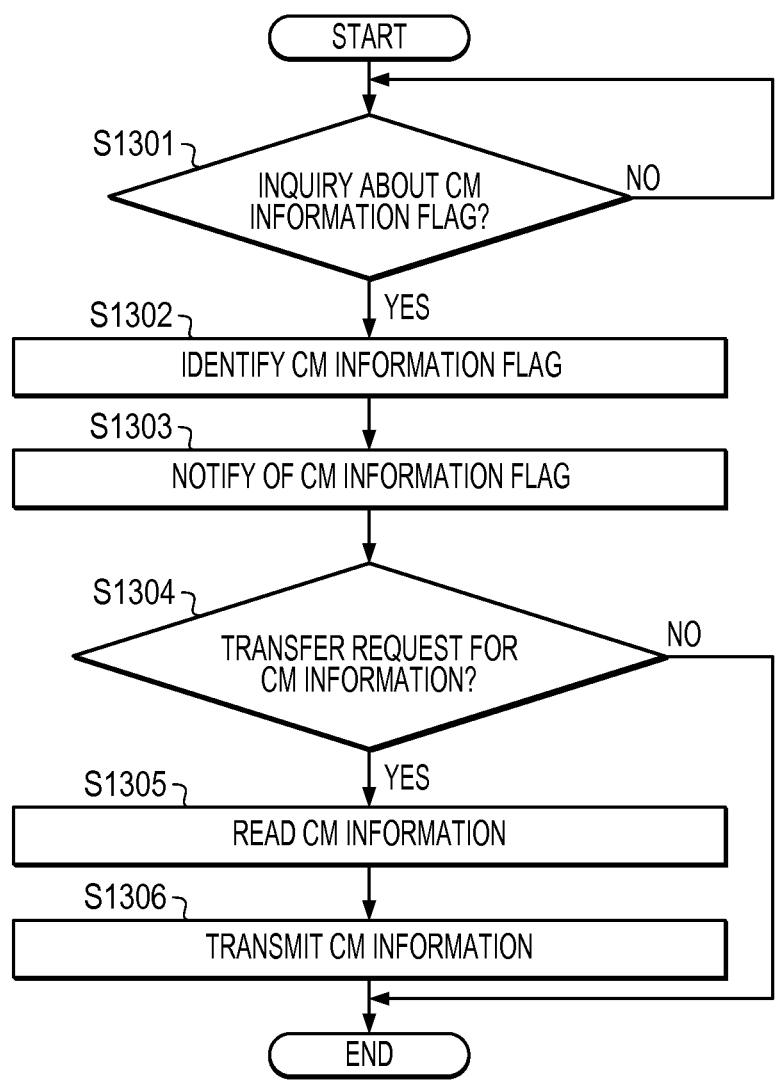
FIG. 13 is a flowchart illustrating an example of a CM information transmission processing sequence performed by a library controller of a tape library apparatus.

FIG. 13 is a flowchart illustrating an example of a CM information transmission processing sequence performed by the library controller 101 of the tape library apparatus 100. In the flowchart illustrated in FIG. 13, the library controller 101 first determines whether or not an inquiry about the CM information flag is received from the tape drive TD (S1301).

The library controller 101 waits for reception of an inquiry about the CM information flag (S1301: No). When an inquiry about the CM information flag is received (S1301: Yes), the library controller 101 identifies the CM information flag with reference to the library flag management information for the tape cartridge TC (S1302).

Next, the library controller 101 notifies the tape drive TD of the identified CM information flag (S1303). Then, the library controller 101 determines whether or not a transfer request for the CM information is received from the tape drive TD (S1304).

When the transfer request for the CM information is received (S1304: Yes), the library controller 101 reads the CM information stored in the VOL information area for the tape cartridge TC within the non-volatile memory 110 (S1305). Then, the library controller 101 transmits the read CM information to the tape drive TD (S1306), and ends the processing sequence illustrated in the flowchart.

When the transfer request for the CM information is not received (S1304: No), the library controller 101 ends the processing sequence illustrated in the flowchart.

With this, normal CM information stored in the non-volatile memory 110 may be transmitted to the tape drive TD in response to the transfer request for the CM information received from the tape drive TD which has failed in reading of the CM information.

Next, a second flag management processing sequence performed by the library controller 101 of the tape library apparatus 100 will be described. The second flag management processing is performed in response to CM information or a tape alert received from the tape drive TD.

Figure 14:
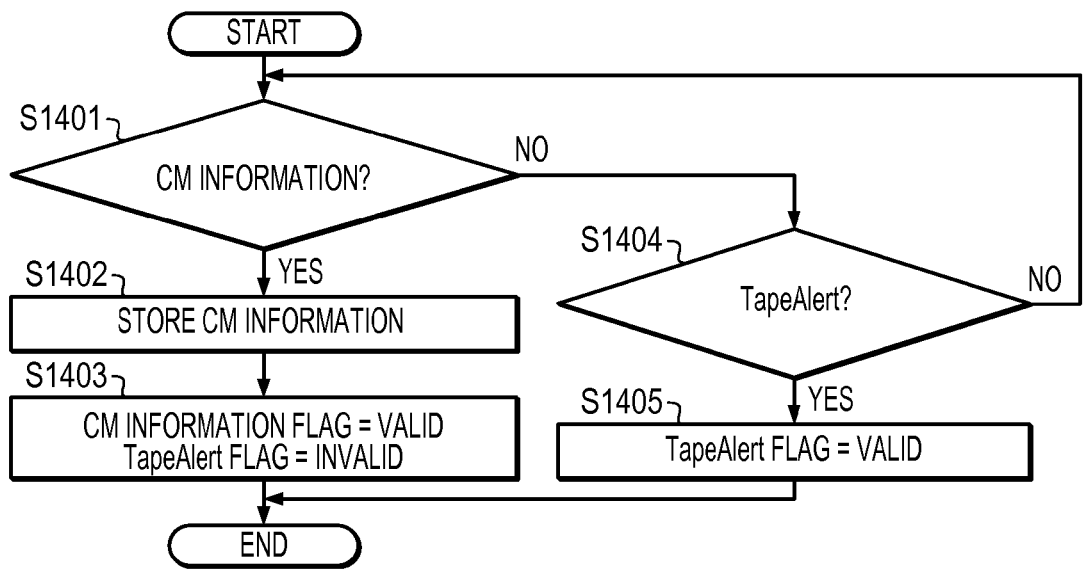
FIG. 14 is a flowchart illustrating an example of a second flag management processing sequence performed by a library controller of a tape library apparatus.

FIG. 14 is a flowchart illustrating an example of a second flag management processing sequence performed by the library controller 101 of the tape library apparatus 100. In the flowchart illustrated in FIG. 14, the library controller 101 first determines whether or not CM information is received from the tape drive TD (S1401).

When CM information is received (S1401: Yes), the library controller 101 stores the received CM information in the VOL information area for the tape cartridge TC within the non-volatile memory 110 (S1402).

Then, the library controller 101 sets the CM information flag of the library flag management information to "valid" and sets the TapeAlert flag to "invalid" (S1403), and thereafter ends the processing sequence illustrated in the flowchart. With this, the latest CM information may be obtained from the tape drive TD at the time of unloading the tape cartridge TC.

When CM information is not received (S1401: No), the library controller 101 determines whether or not a tape alert is received from the tape drive TD (S1404). When a tape alert is not received (S1404: No), the library controller 101 returns to S1401.

When a tape alert is received (S1404: Yes), the TapeAlert flag of the library flag management information for the tape cartridge TC is set to "valid" (S1405), and the library controller 101 ends the processing sequence illustrated in the flowchart. In an example of (12-2) illustrated in FIG. 12, "valid" is set in the TapeAlert flag of the library flag management information 400. With this, the tape cartridge TC which has failed in writing of the CM information in the tape drive TD may be discriminated.

In addition, the processes in the flowchart are performed when the CM information or the tape alert is received from the tape drive TD. Accordingly, the above processing (S1405) is performed even in a case where the tape alert is received after the above processing (S1402 and S1403) is performed for the CM information received by the library controller 101.

Next, an unload processing sequence performed by the library controller 101 of the tape library apparatus 100 will be described. The unload processing is performed when an unload instruction for a tape cartridge TC is received.

The controller 201 of the tape drive TD notifies the library controller 101 of the tape library apparatus 100 of the unload instruction for the tape cartridge TC, for example, when the unload processing performed by the tape drive TD is completed.

Figure 15:
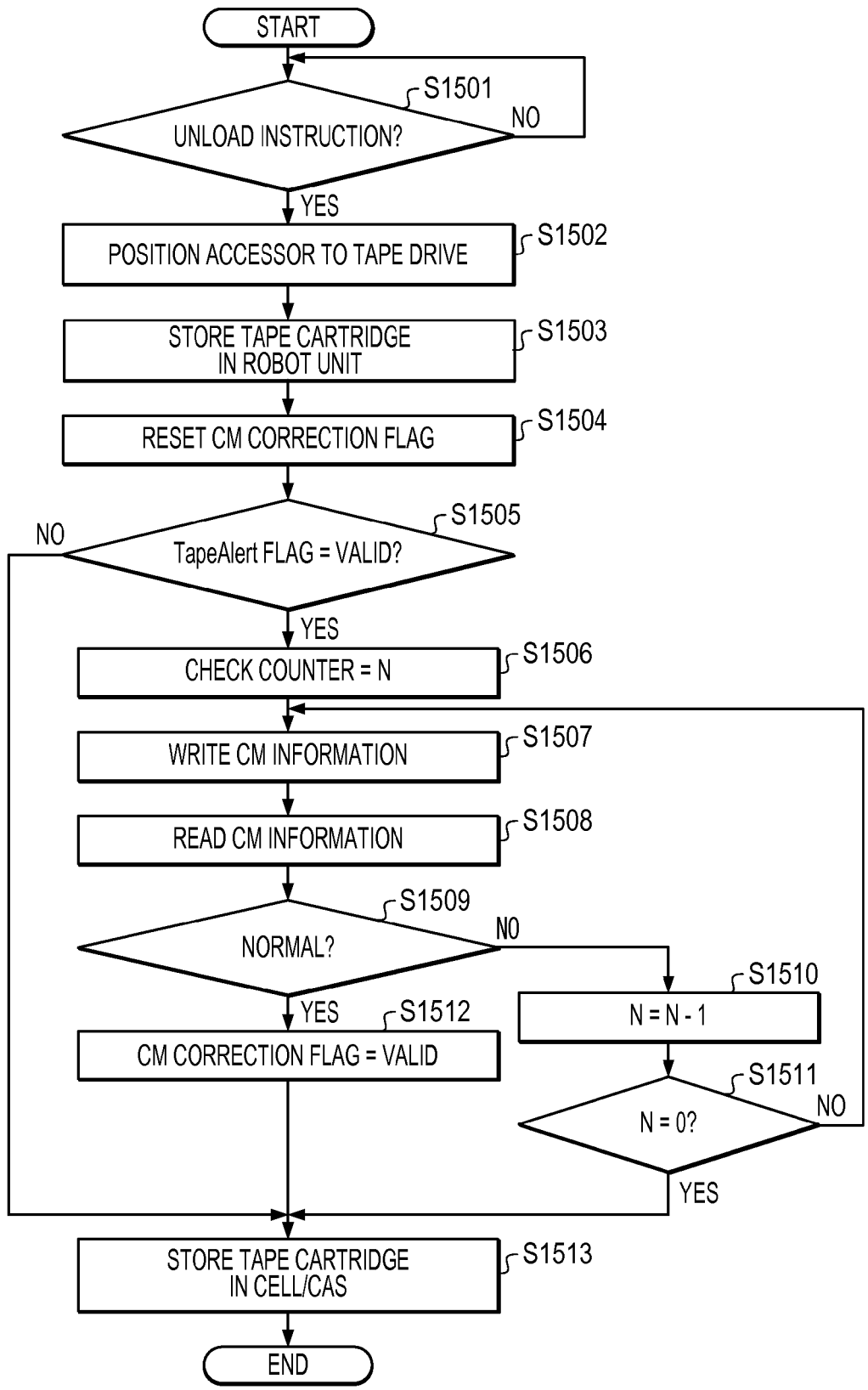
FIG. 15 is a flowchart illustrating an example of an unload processing sequence performed by a library controller of a tape library apparatus.

FIG. 15 is a flowchart illustrating an example of an unload processing sequence performed by the library controller 101 of the tape library apparatus 100. In the flowchart illustrated in FIG. 15, the library controller 101 first determines whether or not an unload instruction for a tape cartridge TC inserted into a tape drive TD is received (S1501). The library controller 101 waits for reception of an unload instruction for a tape cartridge TC (S1501: No).

When an unload instruction for a tape cartridge TC is received (S1501: Yes), the library controller 101 positions, by controlling the robot unit 102, the accessor 103 of the robot unit 102 to a tape drive TD into which the tape cartridge TC to be unloaded is inserted (S1502).

Next, the library controller 101 stores, in the accessor 103 of the robot unit 102, the tape cartridge TC inserted into the tape drive TD (S1503).

Next, the library controller 101 resets the CM correction flag of the library flag management information corresponding to the tape cartridge TC (S1504). Then, the library controller 101 determines whether or not "valid" is set in the TapeAlert flag, with reference to the library flag management information (S1505).

When "invalid" is set in the TapeAlert flag (S1505: No), the library controller 101 proceeds to S1513.

When "valid" is set in the TapeAlert flag (S1505: Yes), the library controller 101 sets a check counter to N (S1506). N is an arbitrarily set integer, for example, three.

Next, the library controller 101 writes, to the CM 210 within the tape cartridge TC, the CM information included in the VOL information for the tape cartridge TC to be unloaded with the CM reader/writer 105 of the robot unit 102 (S1507). Then, the library controller 101 obtains the CM information stored in the CM 210 by reading the CM information stored in the CM 210 with the CM reader/writer 105 of the robot unit 102 (S1508).

Next, the library controller 101 determines whether or not the obtained CM information is normal (S1509). When the obtained CM information is abnormal (S1509: No), the library controller 101 decreases "N" of the check counter (S1510), and determines whether or not "N" becomes "0" (S1511).

When "N" is not "0" (S1511: No), the library controller 101 returns to S1507. That is, the library controller 101 attempts to write the CM information to the CM 210 within the tape cartridge TC as many times as the initial number set in the check counter. When "N" is "0" (S1511: Yes), the library controller 101 proceeds to S1513.

When the obtained CM information is normal (S1509: Yes), the library controller 101 sets the CM correction flag of the library flag management information to "valid" (S1512). In an example of (12-3) illustrated in FIG. 12, "valid" is set in the CM correction flag of the library flag management information 400.

Then, the library controller 101 stores the tape cartridge TC in the cell 106/CAS 107 (S1513), and ends the processing sequence illustrated in the flowchart.

With this, if writing of the CM information in the tape drive TD fails at the time of unloading the tape cartridge TC, writing of the CM information to the CM 210 using the CM reader/writer 105 of the robot unit 102 may be attempted.

Next, various processing sequences performed by the controller 201 of the tape drive TD will be described. First, a load processing sequence performed by the controller 201 will be described. The load processing is performed when a load instruction for a tape cartridge TC is received. An exemplary transition of the drive flag management information in the course of the load processing sequence will be also described.

Figure 16:
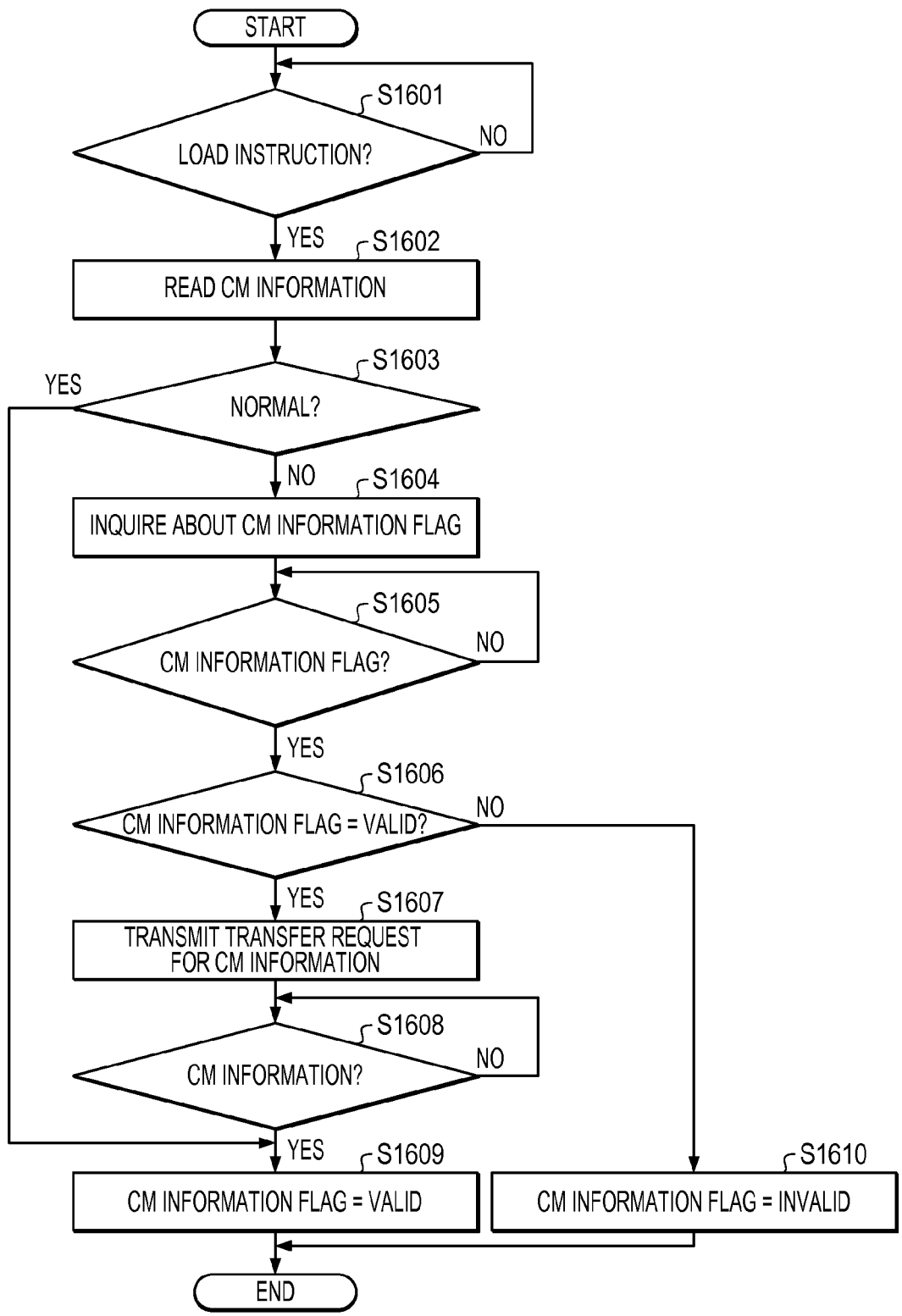
FIG. 16 is a flowchart illustrating an example of a load processing sequence performed by a controller of a tape drive.
Figure 17:
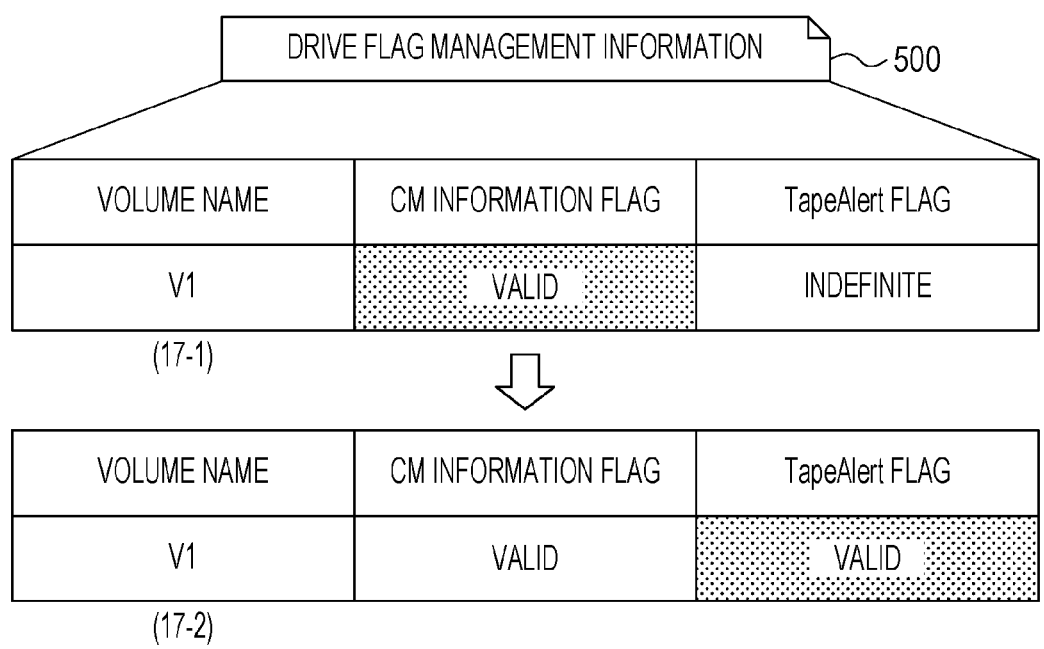
FIG. 17 is a diagram illustrating an exemplary transition of drive flag management information.

FIG. 16 is a flowchart illustrating an example of a load processing sequence performed by the controller 201 of the tape drive TD. FIG. 17 is a diagram illustrating an exemplary transition of the drive flag management information.

In the flowchart illustrated in FIG. 16, the controller 201 first determines whether or not a load instruction for a tape cartridge TC is received (S1601). The controller 201 waits for reception of a load instruction for a tape cartridge TC (S1601: No).

When a load instruction for a tape cartridge TC is received (S1601: Yes), the controller 201 is clutch-coupled with the tape cartridge TC by descending a loader carrier, and obtains CM information stored in a CM 210 within the tape cartridge TC by reading the CM information stored in the CM 210 with the CM reader/writer 202 (S1602).

Next, the controller 201 determines whether or not the obtained CM information is normal (S1603). When the obtained CM information is normal (S1603: Yes), the controller 201 proceeds to S1609.

When the obtained CM information is abnormal (S1603: No), the controller 201 inquires at the library controller 101 of the tape library apparatus 100 about the CM information flag (S1604). Then, the controller 201 determines whether or not a CM information flag is notified from the library controller 101 (S1605).

The controller 201 waits for a CM information flag to be notified (S1605: No). When a CM information flag notification is notified (S1605: Yes), the controller 201 determines whether or not the notified CM information flag is "valid" (S1606).

When the CM information flag is "valid" (S1606: Yes), the controller 201 transmits a transfer request for the CM information to the library controller 101 (S1607). Then, the controller 201 determines whether or not the CM information is received from the library controller 101 (S1608).

The controller 201 waits for reception of the CM information (S1608: No). When the CM information is received (S1608: Yes), the controller 201 sets the CM information flag of the drive flag management information to "valid" (S1609), and ends the processing sequence illustrated in the flowchart.

In an example of (17-1) illustrated in FIG. 17, "valid" is set in the CM information flag of the drive flag management information 500 for the tape cartridge TC having the volume name "V1".

When the CM information flag is "invalid" (S1606: No), the controller 201 sets the CM information flag of the drive flag management information to "invalid" (S1610), and ends the processing sequence illustrated in the flowchart.

With this, even in a case where reading of the CM information fails due to some defect factors, if normal CM information is stored in the library controller 101, the normal CM information may be obtained from the library controller 101. Thereafter, the tape drive TD may perform high-speed positioning of data using CM information obtained from the library controller 101.

Next, an unload processing sequence performed by the controller 201 of the tape drive TD will be described. The unload processing is performed when an unload instruction for a tape cartridge TC is received from the host device 120.

Figure 18:
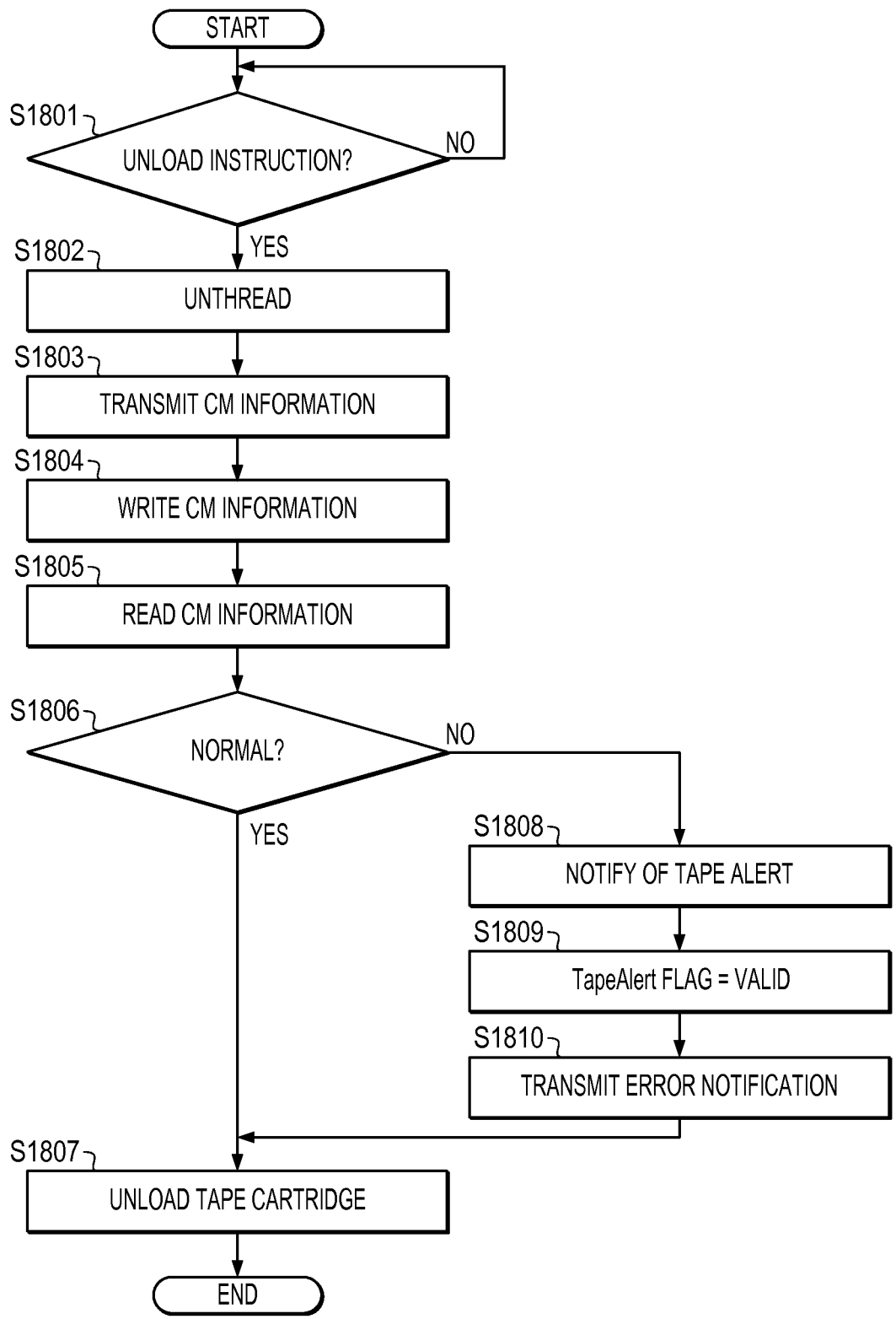
FIG. 18 is a flowchart illustrating an example of an unload processing sequence performed by a controller of a tape drive.

FIG. 18 is a flowchart illustrating an example of an unload processing sequence performed by the controller 201 of the tape drive TD. In the flowchart illustrated in FIG. 18, the controller 201 first determines whether or not an unload instruction for a tape cartridge TC is received from the host device 120 (S1801).

The controller 201 waits for reception of an unload instruction for a tape cartridge TC (S1801: No). When an unload instruction for a tape cartridge TC is received (S1801: Yes), the controller 201 unthreads a magnetic tape 220 by rewinding the magnetic tape (S1802).

Next, the controller 201 transmits CM information managed on the memory 302 to the library controller 101 of the tape library apparatus 100 (S1803). Then, the controller 201 writes the CM information managed on the memory 302 to the CM 210 within the tape cartridge TC with the CM reader/writer 202 (S1804).

Next, the controller 201 obtains the CM information stored in the CM 210 by reading the CM information stored in the CM 210 with the CM reader/writer 202 (S1805). Then, the controller 201 determines whether or not the obtained CM information is normal (S1806).

When the obtained CM information is normal (S1806: Yes), the controller 201 unloads the tape cartridge TC (S1807), and ends the processing sequence illustrated in the flowchart.

When the obtained CM information is abnormal (S1806: No), the controller 201 notifies the library controller 101 of a tape alert (S1808). Next, the controller 201 sets the TapeAlert flag of the drive flag management information to "valid" (S1809).

In an example of (17-2) illustrated in FIG. 17, "valid" is set in the TapeAlert flag of the drive flag management information 500.

Then, the controller 201 transmits an error notification (for example, Sense Page 0x24) of the tape cartridge TC to the host device 120 (S1810), and proceeds to S1807.

With this, the latest CM information may be transmitted to the library controller 101 of the tape library apparatus 100 at the time of unloading the tape cartridge TC. In addition, when writing of the CM information to the CM 210 fails, the library controller 101 and the host device 120 may be notified that the writing of the CM information to the CM 210 fails.

Next, a flag management processing sequence performed by the controller 201 of the tape drive TD will be described. The flag management processing is performed during a low-speed positioning mode into which the tape library apparatus 100 enters when the CM information stored in the CM 210 within the tape cartridge TC is unavailable.

Specifically, for example, the flag management processing is performed in response to a tape operation command received from the host device 120 when the CM information flag of the drive flag management information is "invalid". The tape operation command is, for example, a write command, a read command, a space command, a space file command, a locate command, or the like. When the CM information flag of the drive flag management information is "valid", the high-speed positioning of data is performed in response to the tape operation command received from the host device 120.

Figure 19:
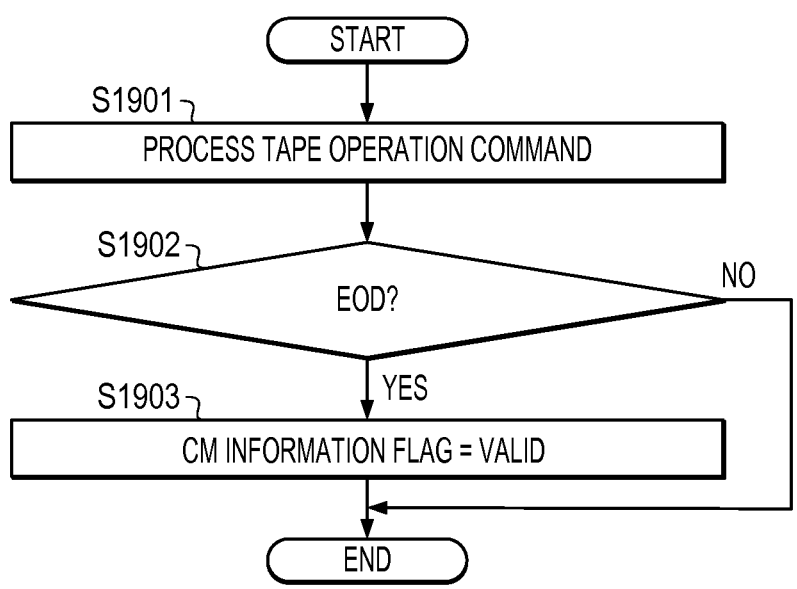
FIG. 19 is a flowchart illustrating an example of a flag management processing sequence performed by a controller of a tape drive.

FIG. 19 is a flowchart illustrating an example of a flag management processing sequence performed by the controller 201 of the tape drive TD. In the flowchart illustrated in FIG. 19, the controller 201 first processes a tape operation command received from the host device 120 (S1901).

Next, the controller 201 determines whether or not a head of the controller reaches the EOD (S1902). When the head of controller does not reach the EOD (S1902: No), the controller 201 ends the processing sequence illustrated in the flowchart.

When the head reaches the EOD (S1902: Yes), the controller 201 sets the CM information flag of the drive flag management information to "valid" (S1903), and ends the processing sequence illustrated in the flowchart.

With this, when the head reaches the EOD during a low-speed positioning mode, since the position information for performing subsequent high-speed positioning is obtained, the tape library apparatus 100 may enter the high-speed positioning mode by setting the CM information flag of the drive flag management information to "valid".

As described above, the library controller 101 of the tape library apparatus 100 according to the embodiment may obtain CM information stored in a CM 210 within a tape cartridge TC by reading the CM information stored in the CM 210 with the CM reader/writer 105 of the robot unit 102. The library controller 101 may store, in the non-volatile memory 110, the obtained CM information stored in the CM 210.

With this, information for performing positioning of data by a tape drive TD may be redundantly stored in the non-volatile memory 110.

When reading of CM information stored in a CM 210 within a tape cartridge TC fails, a controller 201 of a tape drive TD may transmit a transfer request for the CM information stored in the CM 210 to the library controller 101. The library controller 101 may transmit CM information stored in the non-volatile memory 110 to the tape drive TD in response to reception of the transfer request for the CM information received from the tape drive TD.

With this, even in a case where a CM reader/writer 202 of a tape drive TD is out of order, the library controller 101 may transmit CM information stored in the non-volatile memory 110 to the tape drive TD. Therefore, the tape drive TD may perform the high-speed positioning of data using the CM information transmitted from the library controller 101, which reduces the deterioration of access performance.

The library controller 101 may obtain, in response to reception of a load instruction for a tape cartridge TC, CM information stored in a CM 210 within the tape cartridge TC by reading the CM information stored in the CM 210 with the CM reader/writer 105 of the robot unit 102.

With this, CM information may be stored redundantly in the non-volatile memory 110 by reading the CM information stored in a CM 210 within a tape cartridge TC at the time of loading the tape cartridge TC.

The controller 201 may transmit CM information including position information of data recorded in a magnetic tape 220 within a tape cartridge TC to the library controller 101 in response to reception of an unload instruction for the tape cartridge TC. The library controller 101 may store the CM information received from the controller 201 in a VOL information area for the tape cartridge TC within the non-volatile memory 110.

With this, CM information stored in the non-volatile memory 110 may be updated by obtaining the latest CM information from a tape drive TD at the time of unloading a tape cartridge TC. Therefore, even in a case where reading of CM information from a CM 210 is difficult due to some defect factors, if a reading or writing operation up to an EOD for the first time is completed, the high-speed positioning of data may be performed using CM information stored in the non-volatile memory 110 thereinafter. Furthermore, even in a case where a CM 210 of a tape cartridge TC is damaged during operation, the high-speed positioning of data may be performed using CM information stored in the non-volatile memory 110 at the time of next loading of the tape cartridge TC.

The controller 201 may notify, when writing of CM information to a CM 210 fails at the time of unloading a tape cartridge TC, the library controller 101 of a tape alert regarding the tape cartridge TC. When the tape alert is received from the controller 201, the library controller 101 may write CM information stored in the non-volatile memory 110 to the CM 210 with the CM reader/writer 105 of the robot unit 102.

With this, when writing of CM information in a tape drive TD fails, writing of the CM information to the CM 210 may be attempted using the CM reader/writer 105 of the robot unit 102. Therefore, even in a case where writing of CM information is difficult due to poor compatibility between a CM reader/writer 202 of a tape drive TD and a CM 210, although both of them are not out of order, writing of the CM information to the CM 210 may be performed using the CM reader/writer 105 mounted on the robot unit 102.

From the above, the tape library apparatus 100, even in a case where a CM 210 within a tape cartridge TC or a CM reader/writer 202 of a tape drive TD is out of order, the high-speed positioning of data may be performed using CM information stored in the non-volatile memory 110, and may reduce the deterioration of access performance.

The information management method described in the present embodiment may be realized by executing a prepared program by a computer such as a personal computer, a workstation computer, and the like. The program may be recorded in a computer-readable recording medium, such as a hard disk, a flexible disk, a compact disc read-only memory (CD-ROM), a magnetooptic disc (MO), a digital versatile disc (DVD), and the like, and is read from the recording medium and executed by the computer. The program may be distributed through a network, such as the internet and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A tape library apparatus, comprising:
    a tape drive including:
        a first access mechanism configured to access a non-contact type memory within a tape cartridge to read position information from the non-contact type memory, the position information indicating a position of data recorded in a magnetic tape within the tape cartridge, and
        a first processor configured to perform positioning for the data;
    a robot unit including:
        an accessor configured to store the tape cartridge in the robot unit,
        a robot arm configured to move the tape cartridge to the tape drive, and
        a second access mechanism configured to access the non-contact type memory; and
    a second processor configured to
        control the second access mechanism to read the position information from the non-contact type memory, and
        store the position information in a non-volatile memory.

2. The tape library apparatus according to claim 1, wherein
    the first processor is configured to transmit a transfer request to the second processor when the first access mechanism fails to read the position information from the non-contact type memory, the transfer request requesting to transfer position information stored in the non-volatile memory, and
    the second processor is configured to transmit the position information stored in the non-volatile memory to the tape drive in response to reception of the transfer request.

3. The tape library apparatus according to claim 1, wherein
    the second processor is configured to control the robot arm to store a first tape cartridge in the robot unit in response to reception of a load instruction instructing to load the first tape cartridge stored in a cell or a cartridge access station.

4. The tape library apparatus according to claim 1, wherein
    the first processor is configured to transmit first position information of first data recorded in a first magnetic tape within a first tape cartridge to the second processor in response to reception of an unload instruction instructing to unload the first tape cartridge inserted into the tape drive, and
    the second processor is configured to store the first position information received from the tape drive in the non-volatile memory.

5. The tape library apparatus according to claim 4, wherein
    the first processor is configured to notify the second processor of a tape alert regarding the first tape cartridge when the first access mechanism fails to write the first position information to the non-contact type memory, and
    the second processor is configured to control the second access mechanism to write the first position information stored in the non-volatile memory to the non-contact type memory in response to reception of the tape alert.

6. An information management method, comprising:
    accessing, by a first access mechanism included in a tape driver, a non-contact type memory within a tape cartridge to read position information from the non-contact type memory, the position information indicating a position of data recorded in a magnetic tape within the tape cartridge;
    performing positioning for the data by a first processor included in the tape driver;
    storing the tape cartridge in a robot unit by an accessor included in the robot unit;
    moving the tape cartridge to the tape drive by a robot arm included in the robot unit;
    accessing the non-contact type memory by a second access mechanism included in the robot unit;
    controlling, by a second processor, the second access mechanism to read the position information from the non-contact type memory; and
    storing the position information in a non-volatile memory by the second processor.

* * * * *